(12) United States Patent
Carrasco et al.

(10) Patent No.: US 11,820,386 B1
(45) Date of Patent: Nov. 21, 2023

(54) DISTRACTED DRIVING DETECTION AND MITIGATION

(71) Applicant: UIPCO, LLC, San Antonio, TX (US)

(72) Inventors: Elena Carrasco, Converse, TX (US); Will Kerns Maney, San Antonio, TX (US); David Patrick Dixon, Boerne, TX (US); Subhalakshmi Selvam, Allen, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 332 days.

(21) Appl. No.: 17/243,284

(22) Filed: Apr. 28, 2021

Related U.S. Application Data (60) Provisional application No. 63/016,807, filed on Apr. 28, 2020.

(51) Int. Cl.
*B60W 40/09* (2012.01)
*G06V 20/59* (2022.01)
*B60W 40/08* (2012.01)

(52) U.S. Cl.
CPC .......... *B60W 40/09* (2013.01); *G06V 20/593* (2022.01); *G06V 20/597* (2022.01); *B60W 2040/0809* (2013.01); *B60W 2040/0881* (2013.01); *B60W 2540/229* (2020.02)

(58) Field of Classification Search
CPC ........ B60W 40/09; B60W 2040/0809; B60W 2040/0881; B60W 2540/229; G06V 20/593; G06V 20/597; H04M 1/6075; H04M 1/6091; H04M 1/66; H04M 2250/10; H04M 2250/12; H04M 2250/22; H04W 4/027; H04W 4/029; H04W 4/12; H04W 4/40; H04W 4/48; H04W 48/04
See application file for complete search history.

(56) References Cited

U.S. PATENT DOCUMENTS

| | | | |
|---|---|---|---|
| 9,615,213 B2* | 4/2017 | Tibbitts | H04W 48/04 |
| 11,124,195 B1* | 9/2021 | Gu | G07C 5/008 |
| 2007/0120948 A1* | 5/2007 | Fujioka | H04M 1/66 |
| | | | 348/14.01 |
| 2015/0141043 A1* | 5/2015 | Abramson | G01C 21/34 |
| | | | 455/456.1 |

(Continued)

*Primary Examiner* — Peter D Nolan
*Assistant Examiner* — Ce Li Li
(74) *Attorney, Agent, or Firm* — Potomac Law Group, PLLC (57) ABSTRACT

The present disclosure relates to detecting distracted driving on a mobile device and mitigating distracted driving by determining whether a mobile device is used by a driver of a vehicle or by a passenger of the vehicle. The system can determine that the mobile device is in a vehicle and modify the functionality of the mobile device to transition the mobile device into an automobile mode. Vehicle data and/or mobile device data can be used to determine a number of individuals in the vehicle. An identity of the operator of the mobile device can be authenticated based on authentication information obtained by the mobile device. Based on the authenticated identity of the operator of the mobile device, a driving score associated with the driver can be modified, where the score indicates a number of instances of distracted driving by the driver.

17 Claims, 5 Drawing Sheets

(56) References Cited

U.S. PATENT DOCUMENTS

| | | | |
|---|---|---|---|
| 2015/0181414 A1* | 6/2015 | Bretscher | H04W 4/12 |
| | | | 455/418 |
| 2015/0213555 A1* | 7/2015 | Barfield, Jr. | H04W 4/48 |
| | | | 705/4 |
| 2018/0097923 A1* | 4/2018 | Pandurangarao | H04W 68/005 |
| 2018/0097928 A1* | 4/2018 | Pandurangarao | |
| | | | H04M 1/72412 |
| 2018/0183923 A1* | 6/2018 | McSchooler | H04W 4/40 |
| 2021/0114601 A1* | 4/2021 | Balakrishnan | H04W 4/027 |
| 2023/0134558 A1* | 5/2023 | Rodoni | G06Q 40/08 |
| | | | 705/4 |

* cited by examiner

DISTRACTED DRIVING DETECTION AND MITIGATION

CROSS-REFERENCE TO RELATED APPLICATION

This application is a non-provisional of and claims priority to U.S. Provisional Application No. 63/016,807, filed on Apr. 28, 2020, entitled "DISTRACTED DRIVING DETECTION AND MITIGATION," which is hereby incorporated by reference in its entirety for all purposes.

TECHNICAL FIELD

This disclosure is directed generally to systems, methods, and apparatuses for determining instances of distracted driving by processing various forms of data.

BACKGROUND

In many cases, operating a vehicle (e.g., an automobile) generally requires a requisite amount of focus on performing driving tasks. For instance, the operator of a vehicle generally is aware of the environment surrounding the vehicle (e.g., lane markers of a road, other vehicles on the road) in order to safely operate the vehicle. In the event that the operator of the vehicle loses this focus on performing driving tasks, the likelihood of performing unsafe driving actions or involvement in a vehicle accident may increase.

The rise in popularity of mobile devices (e.g., smartphones, tablets, wearable devices) has also increased instances of distracted operation of the vehicle. Mobile devices have various functionalities (e.g., text messages, social media applications, view videos) that alert drivers of new content and draw drivers' attention away from their surroundings. For example, a mobile device may output an audio alert to the user when a new text message has been received, prompting the operator of the vehicle to attempt to view the message while operating the vehicle, thus distracting the driver from the surroundings around the vehicle. Accordingly, mobile devices may increase a frequency in which the driver is distracted while operating the vehicle.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Distracted operation of a vehicle increases risks of performing unsafe driving actions or being involved in a vehicle accident. While various safety features can attempt to mitigate vulnerability to various types of unsafe driving actions or accidents while operating a vehicle, distracted driving can increase the likelihood of involvement in a vehicle accident.

The rise of popularity of the mobile device has contributed to the increase in instances of distracted driving. Various applications of the mobile device are designed to draw the attention of the user to the mobile phone. For instance, an application may alert the mobile device owner of new updates to the application. For instance, upon receipt of a phone call or text message on an application executing on the mobile device, the mobile device can audibly output an alert to notify the operator of the mobile device of the incoming phone call or text message. Such alerts on the mobile device may distract the operator of the vehicle by drawing attention to the mobile device.

Further, in many cases, there may be more than one individual in a vehicle, where one individual is the operator of the vehicle while other individuals are passengers. In these cases, unlike the operator of the vehicle, the passengers of the vehicle are able to access and interact with mobile devices during operation of the vehicle.

One method to limit distracted driving on a mobile device is to lock or limit functionality of various applications on the mobile device associated with the operator of the vehicle. However, locking or limiting access to applications on a mobile device can reduce user experience. For instance, locking a device may prohibit rightful use of the mobile device by passengers of the vehicle who are able to operate a mobile device without restriction during movement of a vehicle. As another example, the driver of the mobile device may indicate that they are a non-driver of the vehicle to gain access to the previously-locked functions on the mobile device.

In some cases, a way to identify a user of a mobile device can include installing sensor(s) in the vehicle to assist in identifying whether the user of a mobile device is the operator of the vehicle or a passenger of the vehicle. For instance, a camera can be installed in a vehicle to attempt to capture images of individuals and process the images to identify a user of a mobile device. However, installation of such devices can be difficult and resource intensive. Further, installation of additional sensors in a vehicle can lead to privacy concerns, as unauthorized access to such sensors can lead to inappropriate dissemination of private information captured by the sensors.

System Overview

The present embodiments relate to detecting distracted driving on a mobile device and mitigating distracting driver by determining whether a mobile device is used by a driver of a vehicle or by a passenger of the vehicle. The system can determine that the mobile device is in a vehicle and modify the functionality of the mobile device to transition the mobile device into an automobile mode. The system can receive data from the vehicle or from another application on the mobile device using various vehicle sensors (e.g., seatbelt sensors, car seat weight sensors, camera(s) in the car) to determine whether the vehicle is in an operational state or to determine a number of individuals in the vehicle.

This data can be used to determine a number of individuals in the vehicle. For instance, if only one person (e.g., the driver) is detected in the vehicle, then the system determines that any operation of the mobile device is performed by the driver of the vehicle. In such an instance, various features or applications can be locked or have limited functionality to mitigate distracted driving.

If more than one individual is in the vehicle, it can be determined whether the operator of the mobile device is the driver or a passenger of the vehicle. This can be performed using sensors of the vehicle or the mobile device (e.g., a mobile device camera, fingerprint sensor) or by requesting additional authentication (e.g., a fingerprint, password) to authenticate an operator of the mobile device. For instance, the mobile device can include multiple profiles and each profile can be associated with a specific user. Accordingly, the mobile device can use various data to determine an identity of an operator of the mobile device.

During operation of the vehicle, sate driving can be scored by an application executing on the mobile device by deriving a driving score. This can turn safe driving into a game, where a higher driving score can be achieved by performing safe driving actions. For example, the driving score can be increased based on the driver focusing on the environment surrounding the vehicle and not interacting with the mobile device while operating the vehicle. Further, the driving score can be increased if a passenger operates the mobile device while the driver maintains focus on the environment surrounding the vehicle. Conversely, if the driver engages with the mobile device while operating the vehicle, the driving score can be reduced.

Figure 1:
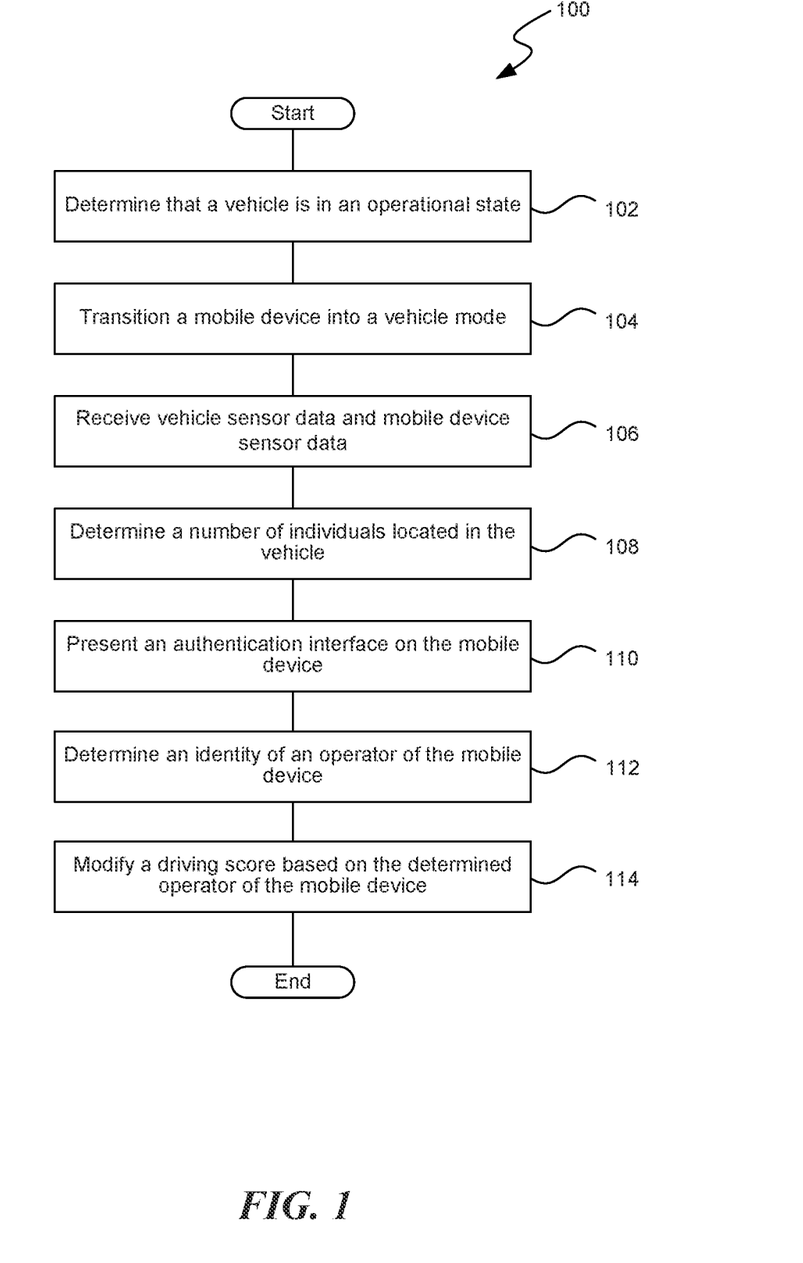
FIG. 1 shows an example block diagram of a method for deriving an identity of an operator of a mobile device during operation of a vehicle and modifying a driving score.

FIG. 1 shows an example block diagram of a method 100 for deriving an identity of an operator of a mobile device during operation of a vehicle and modifying a driving score. As shown in FIG. 1, the method 100 can include determining that the vehicle is in an operational state (block 102). The vehicle in an operational state can include the vehicle either moving or in a position to begin moving. For example, when the vehicle transitions from a "parked" state, the vehicle may be in an operational state.

In some embodiments, determining that the vehicle is in an operational state can include inspecting vehicle and/or mobile device data to derive whether the vehicle is in the operational state. For example, if the mobile device detects that it is within the vehicle (e.g., the mobile device connects to a vehicle-specific interactive entertainment system), the mobile device can determine that the mobile device is within the vehicle and that the vehicle is in the operational state. As another example, if sensors of the mobile device detect a travelling speed of the mobile device exceeding a threshold speed (e.g., a speed greater than that of a user walking or riding a bicycle), the mobile device can determine that the vehicle is in an operational state.

The vehicle can provide various types of data indicative of the vehicle being in an operating state. For instance, the vehicle can provide operation information (e.g., whether the vehicle is on, a transmission state of the vehicle (e.g., "park," "reverse," "drive"), vehicle sensor information seatbelt sensors, cameras disposed in the vehicle, car seat weight sensors)). The mobile device can process vehicle data to determine whether the vehicle is in an operational state. For example, responsive to determining that the mobile device is within the vehicle, the mobile device can detect that the vehicle is moving.

In some embodiments, ignition state information and/or transmission state information included in the set of vehicle sensor data can be processed to determine whether an ignition state and/or transmission state of the vehicle corresponds to the operational state. The server may be configured to cause the client device to transition into the vehicle mode responsive to determining that the vehicle is in the operational state.

In some embodiments, the client device can determine whether the client device is within a communication range of a communication interface of the vehicle. The client device may be configured to transition into the vehicle mode responsive to determining that the client device is within the communication range of the communication interface of the vehicle.

The method 100 can include transitioning the mobile device into a vehicle mode (block 104). Transitioning the mobile device into a vehicle mode can modify various functionalities of the mobile device, such as locking down or limiting various functions on specific applications or features of the mobile device. For example, text-messaging applications can be modified in the vehicle mode to prevent outgoing text messages, prevent text message notifications from being presented on the mobile device, etc.

In some embodiments, when the mobile device is in a vehicle mode, the mobile device may request additional authentication before allowing access to various features/applications on the mobile device. For instance, this can include requesting an indication from the operator of the mobile device that the operator is not the driver of the vehicle.

As another example, before allowing access to various applications on the mobile device, the mobile device may present a request for authentication information from the operator before allowing access. The requested authentication information can include a passcode, a fingerprint of the operator, a facial recognition-based identification of the operator, etc. In this example, responsive to identifying the operator and determining that the identified operator of the mobile device is not the driver, the operator of the mobile device may access applications of the mobile device.

In some embodiments, the client device can determine whether the client device is within a communication range of a communication interface of the vehicle. For example, this can include the client device connecting to an entertainment system of the vehicle. The client device can be configured to transition into the vehicle mode responsive to determining that the client device is within the communication range of the communication interface of the vehicle.

In some embodiments, a vehicle mode on the client can be implemented that limits access to a series of features of applications executing on the client device until the operator of the client device is authenticated. The vehicle mode can initiate the presentation of the authentication interface on the client device. The authentication interface can include a lock screen or an audio prompt including the request for the set of requested identifying information. Responsive to authenticating the identity of the operator of the client device the client device can remove the authentication interface from the client device and allowing access to the series of features of applications executing on the client device.

The method 100 can include receiving vehicle sensor data and mobile device sensor data (block 106). The received data can be utilized in identifying a number of individuals in the vehicle and whether the operator of the mobile device is the driver or a passenger. Received vehicle sensor data can be obtained by the mobile device via a suitable communication interface. For instance, vehicle sensor data can be obtained wirelessly from the vehicle via a short-range wireless communication interface (e.g., Bluetooth®).

Examples of received vehicle data can include car seat weight sensor data, seatbelt sensors, data from cameras disposed within the vehicle, data from an in-vehicle interactive entertainment system, etc. A computing device disposed on the vehicle can obtain the vehicle data. and transmit the vehicle data to the mobile device.

The method 100 can include determining a number of individuals located in the vehicle (block 108). This can include using retrieved vehicle data and/or mobile device data to determine a number of individuals disposed within the vehicle. If the number of individuals in the vehicle includes only the driver, it can then be assumed that all operation on the mobile device is performed by the driver. If there is more than one individual located in the vehicle, the operator of the mobile device can be determined, as described below.

As an example, seatbelt sensors disposed in a vehicle can include information representing whether each seatbelt is engaged, thereby indicative of whether an individual is sitting in each seat. The mobile device can obtain the seatbelt data and process such data to identify a location of each seatbelt engaged in the vehicle. As another example, the mobile device can obtain car seat weight sensor data, vehicle door opening information, etc., and process such data to determine whether an individual is sitting in each location of the vehicle. As yet another example, camera(s) disposed in the vehicle can captured images of the vehicle environment and process the image data to determine a number of individuals disposed in the vehicle.

Further, a number of individuals in the vehicle can be detected using various sensor data acquired by mobile device sensors. Mobile device sensor (e.g., camera(s), microphone) data can be used to identify a number of individuals in the vehicle. For instance, a camera disposed on the mobile device can capture images that can be processed (e.g., either locally at the mobile device or remotely at a remote computing node) to derive a number of individuals identified in the images. The images can be processed using facial recognition techniques to identify a number of individuals in the images.

As another example, audio data acquired by a microphone on the mobile device can be processed to identify a number of voices detected in a vehicle, each voice indicative of an individual in the vehicle. As yet another example, the mobile device can detect a number of other mobile devices (e.g., smartphones, wearable devices, tablets) associated with other individuals that are within a wireless communication range of the mobile device. For instance, if the mobile device detects three other mobile devices within a wireless communication range (e.g., Bluetooth® range) of the mobile device, and the mobile device can determine that three other individuals are located in the vehicle based on their mobile devices being located in the vehicle.

In some embodiments, received vehicle sensor data can be parsed to identify regions in the vehicle in which one or more vehicle sensors have been activated. The vehicle sensor data can include any of vehicle seat weight sensor data, vehicle door sensor data, and/or vehicle imaging device sensor data. :A number of individuals located in the vehicle can be derived based on each identified region in the vehicle in which in which one or more vehicle sensors have been activated.

In some embodiments, responsive to determining that the client device is within the vehicle, the client device can obtain information relating to a number of network-accessible devices within a wireless communication range of the client device. For instance, if the client device is within a short-range wireless communication range (e.g., Bluetooth®) of a srnartphone and a wearable electronic device, a number of individuals located in the vehicle can be determined based on these devices. As an example, a primary user of each device can be representative of an individual in the vehicle. The information relating to the number of network-accessible devices can be processed to identify a number of individuals corresponding to the number of network-accessible devices, the number of individuals indicative of a number of individuals located within the vehicle.

The method 100 can include presenting an authentication interface on the mobile device (block 110). An authentication interface can include an interface on the mobile device requesting additional information to authenticate the identity of the individual operating the mobile device. The authentication interface can be presented on the mobile device responsive to determining that the vehicle is in an operational state or determining that more than one individual is located within the vehicle.

The authentication interface can include a display on the mobile device locking various functionality of the mobile device until authentication information is provided to the mobile device. The requested authentication information can include an indication that the individual operating the mobile device is a passenger or information specific to an individual. Authentication information that is specific to an individual can include a user-specific passcode, a fingerprint, an audio passcode, facial recognition information, etc. In some embodiments, the authentication interface can include an audio request for authentication information.

The method 100 can include detecting an identity of an operator of the mobile device (block 112). This can include processing vehicle data, mobile device data, mobile device profile information, and/or authentication information received by the mobile device to identify an identity of the operator of the mobile device. For instance, a fingerprint sensor on the mobile device can inspect a fingerprint provided as authentication information to determine whether the fingerprint is associated with the driver of the vehicle or a passenger of the vehicle.

The mobile device can access multiple user profiles and each profile can include information specific to a different individual. For example, a first profile associated with a first individual can store a passcode specific to the individual, a stored fingerprint of the user, facial recognition information for the individual, etc. Information of each profile can be compared with provided authentication information to identify a profile (and, thereby, an individual) associated with the authentication information.

As an example, multiple types of information can be utilized in identifying an identity of an individual operating the mobile device. For instance, the mobile device can be associated with a first user. The mobile device can use vehicle data and/or mobile device data to derive a number of additional individuals in the vehicle other than the first user. Further, the mobile device can use various data to determine whether the first user is a driver or a passenger in the vehicle. The mobile device can then derive whether an operator of the mobile device is the first user or another user based on sensor data and/or authentication information.

In some embodiments, the system can determine whether the operator of the mobile device is truthful as to their assertion as to whether the operator of the mobile device is the driver or a passenger of the vehicle. As noted above, the system can derive whether a user associated with the mobile device is the driver or a passenger of the vehicle. Further, upon identifying the user using authentication information (e.g., a fingerprint provided by the user), the mobile device can identify the identity of the operator of the mobile device. The mobile device can determine whether the operator of the mobile device is actually the driver or the passenger in the vehicle. Accordingly, if providing authentication information includes an assertion that the operator is not the driver of the vehicle. The mobile device can determine whether the operator of the mobile device is actually the driver of the vehicle.

In some embodiments, authenticating the identity of the operator of the client device can include deriving a type of information included in the set of requested identifying information. The type of information can include any of a fingerprint, an image depicting a face, and a passcode indicative of the operator of the client device. The set of requested identifying information can be compared with the known authentication information of a corresponding type to determine a first set of known authentication information that corresponds to the set of requested identifying information. A first profile of multiple profiles can be identified that includes the first set of known authentication information. The first profile can be associated with an individual that corresponds to the operator of the client device.

The method 100 can include modifying a driving score based on the determined operator of the mobile device (block 114). The driving score can be indicative of a frequency in which the driver of the vehicle is distracted from driving the vehicle. For instance, for each instance that the driver engages with the mobile device while the vehicle is operational, the driving score can be reduced. Alternatively, if the driver focuses on driving and does not engage with the mobile device or performs other safe driving habits (e.g., drive at or below a speed limit), the driving score can be increased.

The driving score can be modified based on determining whether an operator of the phone is the driver or a passenger. For instance, if the driver is identified as the operator of the mobile device, the driving score may be reduced. In some embodiments, the driving score can also be modified based on processing vehicle data to determine whether the driver is practicing safe driving habits. For instance, if the driver is travelling above a speed limit or does not wear a seatbelt, the driving score can be reduced, as these driving habits increase risk or severity of incidences of a vehicle accident. In this example, vehicle data (e.g., seatbelt sensor data) can be obtained by mobile device and processed to determine whether various safe driving habits are practiced.

The driving score can be periodically or dynamically modified over a period of time. For instance, while the vehicle is in an operational state, the driving score can be repeatedly modified based on various factors (e.g., driving characteristics, the identity of the phone operator). The driving score can be compiled over a period of time for each time the vehicle is operating.

As noted above, a determined identity of the operator of the mobile device can impact the driving score. If only a single person (e.g., the driver) is detected in the vehicle (e.g., as discussed with block 108), any mobile device interaction is assumed to be by the driver. Accordingly, in this event, any interaction with the mobile device while operating the vehicle lowers the driving score.

In the event that more than one individual is located in the vehicle, various sources of information can be processed to derive an identity of the operator of the mobile device. For instance, as noted above, authentication information (e.g., a passcode, a fingerprint of the mobile device operator) can identify an identity of the operator of the mobile device. Further, vehicle data (e.g., vehicle camera data) or mobile device data (e.g., mobile device camera, microphone) can be utilized in deriving an identity of the mobile device operator. For example, if a camera on the mobile device captures images of the passenger's face, the mobile device can perform facial recognition to identify the passenger as the operator of the mobile device.

Vehicle Environment Overview

Figure 2:
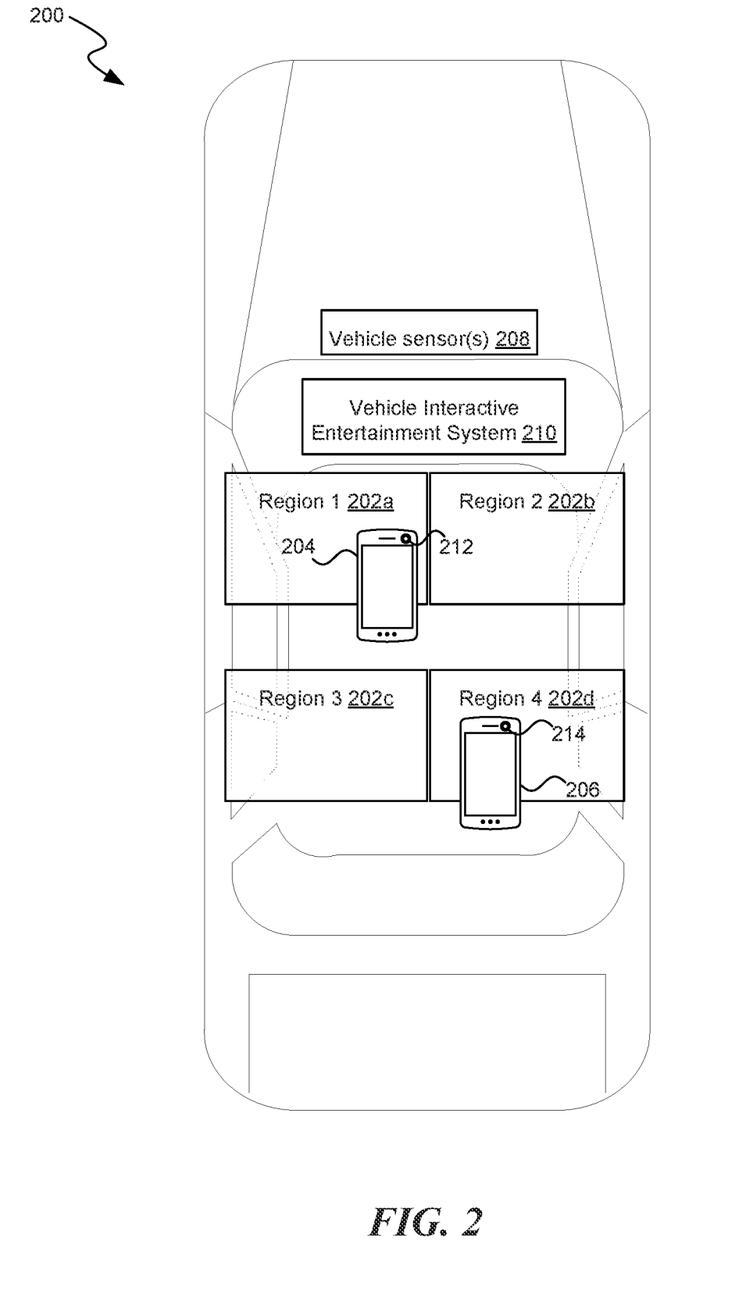
FIG. 2 shows a block diagram of an example vehicle in which the present embodiments can be implemented.

FIG. 2 shows a block diagram of an example vehicle 200 in which the present embodiments can be implemented. While an automobile is provided as an illustrative example of a vehicle, the vehicle 200 can comprise any vehicle type (e.g., automobile, truck, train, airplane). In some embodiments, the vehicle 200 can comprise various regions. For instance, vehicle 200 can include regions 202a-d. A first region 202a can include a region comprising the driver's seat area, while second region 202b, third region 202c, and fourth region 202d can include regions comprising passenger seat areas. As described below, sensor data from each region 202a-d can be used to determine a presence and/or identity of individuals located within regions 202a-d of the vehicle 200.

The vehicle 200 can include at least one mobile device (e.g., smartphones 204, 206) disposed within the vehicle environment. Each mobile device can be primarily associated with an individual. For example, smartphone 204 is associated with a driver and smartphone 206 is associated with a passenger located in region 4 202d. A mobile device (e.g., smartphone 204) can electrically connect to and transmit information between other devices (e.g., smartphone 206). Mobile devices can include various sensors (e.g., sensor 212, 214). Examples of mobile device sensors (e.g., sensors 212, 214) can include camera(s) disposed on the mobile devices, gyroscopes, fingerprint sensors, accelerometers, microphones, etc.

The vehicle 200 can include one or more vehicle sensors 208. Example vehicle sensors can include vehicle seat weight sensors, cameras disposed within or exterior to the vehicle, seatbelt sensors, vehicle door sensors, vehicle operational sensors (e.g., a sensor determining a transmission state of the vehicle, an accelerometer), etc. The vehicle sensors 208 can communicate with a computing node disposed within the vehicle 200 configured to obtain vehicle sensor data and perform subsequent actions based on the vehicle sensor data.

The vehicle 200 can include a vehicle interactive entertainment system 210. The vehicle interactive entertainment system 210 can facilitate entertainment output (e.g., audio, navigation information) in the vehicle 200. In some instance, the vehicle interactive entertainment system 210 can interact with a mobile device smartphone 204). For instance, smartphone 204 can provide audio data to vehicle interactive entertainment system 210 via a wireless/wired communication interface for the vehicle interactive entertainment system 210 to output audio through audio devices (e.g., speakers) in the vehicle 200. In some embodiments, the vehicle 200 can include a communication interface capable of transmitting vehicle sensor data to a mobile device. The communication interface can allow for a mobile device to obtain vehicle sensor data from the vehicle 200.

Figure 3:
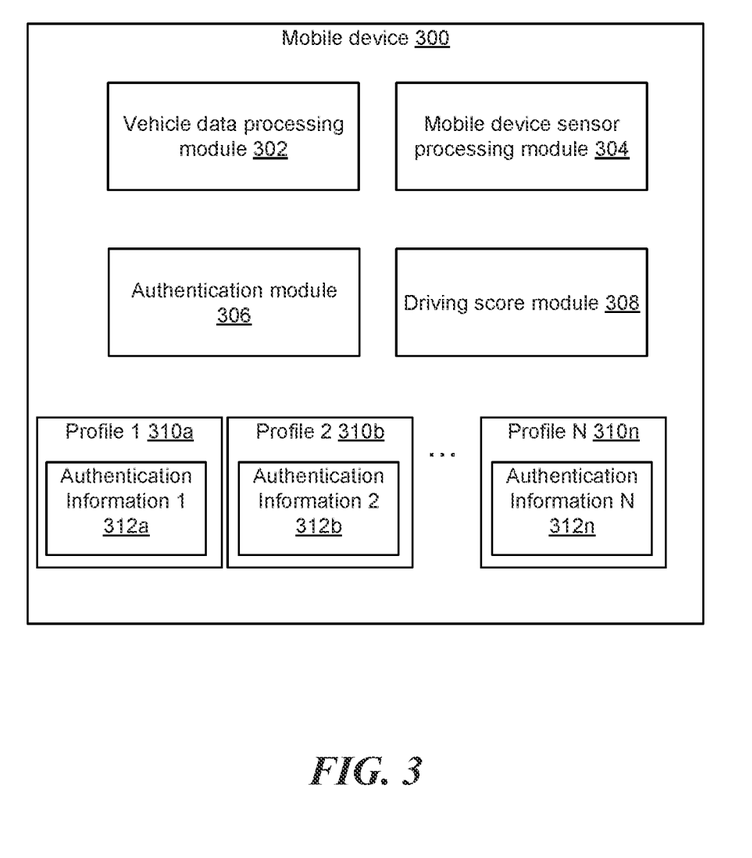
FIG. 3 is a block diagram of an example mobile device in which the present embodiments can be implemented.

FIG. 3 is a block diagram of an example mobile device 300 in which the present embodiments can be implemented. As noted above, the mobile device 300 can include a network-accessible electronic device, such as a smartphone, tablet, wearable electronic device, etc. The mobile device 300 can include processing resources capable of executing tasks relating to modules 302, 304, 306, 308.

While the embodiment as described with respect to FIG. 3 illustrates a mobile device executing various processing tasks, any number of remote computing nodes can perform processing tasks as described herein. For instance, a remote computing node (e.g., a cloud computing system) can store various data and/or perform processing tasks. In such an instance, data can be communicated between mobile device and remote computing node via a suitable wireless communication interface.

An example module capable of being executed by mobile device 300 can include a vehicle data processing module 302. The vehicle data processing module 302 can obtain vehicle sensor data and process the vehicle sensor data as described herein. For instance, the vehicle data processing module 302 can include the mobile device obtaining seatbelt sensor data from the vehicle.

The vehicle data processing module 302 can inspect vehicle data to determine whether the mobile device is located within the vehicle and whether the vehicle is in an operational state. For instance, upon the mobile device connecting to a vehicle interactive entertainment system of a vehicle via a suitable interface, the vehicle data processing module 302 can determine that the mobile device 300 is disposed within the vehicle. As another example, the vehicle data processing module 302 can process vehicle data (e.g., transmission state information, operational state information) to determine whether the vehicle is in an operational state. For instance, the mobile device can determine that the vehicle is in a "Drive" transmission state, indicating that the vehicle is in an operational state.

The mobile device 300 can use the vehicle sensor data to identify a number of individuals located within the vehicle. For instance, the vehicle data processing module 302 can process seatbelt sensor data from the vehicle to determine a number of seatbelts that are engaged, indicating that an individual is located at each seat with a seatbelt engaged. Further, the vehicle data processing module 302 can process images captured by cameras disposed within the vehicle or audio captured by a microphone in the vehicle to identify a number of different individuals in the vehicle.

Another example module capable of being executed by mobile device 300 can include a mobile device data processing module 304. The mobile device data processing module 304 can process mobile device sensor data (e.g., data from camera(s) disposed on the mobile device, finger print sensor data) to derive various information.

For instance, the mobile device can process mobile device sensor data to derive a number of individuals in the vehicle. As another example, the mobile device can determine whether a primary user of the mobile device is a driver or a passenger of the vehicle. For instance, location data of the mobile device can be processed to derive whether the mobile device is located with a region associated with the driver or the passenger of the vehicle, The mobile device data processing module 304 can process mobile device sensor data that can be utilized along with the vehicle sensor data to derive various information as described herein.

Another example module capable of being executed by mobile device 300 can include an authentication module 306. The authentication module 306 can provide an authentication interface on the mobile device requesting authentication information from the operator of the mobile device. For instance, the authentication interface 306 can include a lock screen preventing access to various applications until authentication information is retrieved and verified by the mobile device.

The authentication module 306 can detect authentication information passcode, facial recognition information, fingerprint information) and determine an identity of the operator of the mobile device based on the authentication information. In some embodiments, the authentication interface can be implemented by an application executing on the mobile device.

The authentication information can be compared with authentication information previously obtained (e.g., authentication information 312a-n maintained in various profiles 310a-n) to determine a profile that corresponds to the authentication information. For instance, each profile 310a-n can be associated with a different individual, and each profile 310a-n can include corresponding authentication information 312a-n indicative of the individual. Example authentication information 312a-n can include passwords, fingerprint information, facial recognition information, etc., that can be used to identify an individual. Responsive to matching authentication information with a corresponding profile 310a-n, the mobile device can identify the operator of the mobile device that is associated with the corresponding profile.

Another example module capable of being executed by mobile device 300 can include a driving score module 308. A driving score module 308 can include processing various information (e.g., information derived by the vehicle data processing module 302 or the mobile device sensor processing module 304) to modify a driving score associated with an individual (e.g., a driver of the vehicle).

As noted above, the driving score can be based on driving habits of the driver of the vehicle. For instance, when the driver is distracted (e.g., accessing the mobile device), the driving score can be reduced. This can be detected responsive to the driving score module determining that the driver of the vehicle is operating the mobile device. Conversely, the driving score can be increased responsive to determining that the driver is not distracted (e.g., the operator of the mobile device is not the driver).

Figure 4:
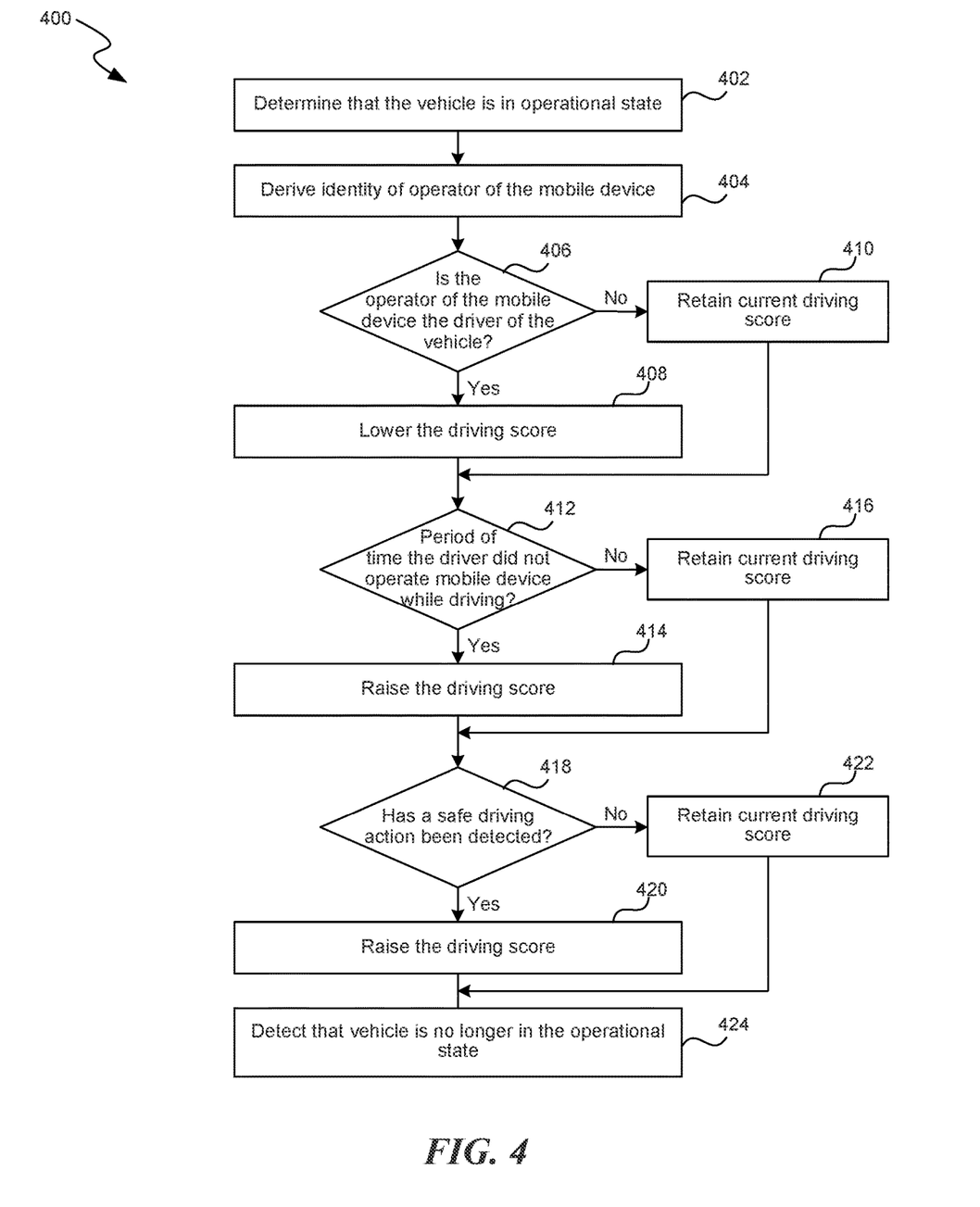
FIG. 4 is a flowchart illustrating example instances to modify a driving score.

The driving score can be periodically updated during operation of the vehicle. For example, during a period of time (e.g., a time of operation of the vehicle, a predetermined time duration), various instances of detected distracted driving can impact the driving score. In some embodiments, the driving score can be impacted based on determined vehicle movements of the vehicle, FIG. 4 is a flowchart 400 illustrating example instances to modify a driving score. As shown in FIG. 4, the system can determine whether the vehicle is in the operational state (block 402). As noted above, the vehicle is in an operational state if the mobile device is within a communication range of the vehicle, a transmission state of the vehicle is activated, an ignition state of the vehicle is activated, etc. When the vehicle is in the operational state, the driving score can be dynamically updated based on various inputs.

The system can derive an identity of the operator of the mobile device (block 404). The operator of the mobile device can include an individual interacting with the mobile device. The operator of the mobile device can also include any individual disposed in the vehicle.

In some instances, the derivation of the identity of the operator of the mobile device can be based on the number of individuals located in the vehicle. For instance, mobile device sensor data and/or vehicle sensor data can be processed to derive a number of individuals in the vehicle. If only one individual (e.g., the driver) is in the vehicle, it can be assumed that any operation of the mobile device is performed by the driver. If multiple individuals (e.g., a driver and at least one passenger) are in the vehicle, the identity of the operator of the mobile device can impact the driving score.

Deriving the identity of the operator can be based on processing authentication information provided by the operator of the mobile device and authenticating their identity. For example, a fingerprint provided by the operator can be compared with a series of known fingerprints stored in multiple profiles to derive a first known fingerprint associated with a first individual. From authenticating the identity of the operator, the driving score can be updated as described below.

The system can determine whether the operator of the mobile device is the driver of the vehicle (decision block 406). This can be based on a determination of a number of individuals located in the vehicle. A determination of whether the operator of the mobile device is the driver or a passenger of the vehicle can impact whether the driving score is modified.

In some embodiments, the set of client device data and the set of vehicle sensor data can be processed to derive a number of individuals located in the vehicle. For example, imaging data can be processed to derive a number of individuals detected in the images. Responsive to determining that the number of individuals indicates one individual (e.g., the driver), for each instance that the identity of the operator of the client device is the authenticated while the vehicle is in the operational state, the driving score associated with the driver can be reduced.

If the operator of the mobile device is the driver of the vehicle, the current driving score can be lowered (block 408). The current driving score can be lowered by any suitable amount. The amount of lowering the driving score can be based on a frequency in which the operator of the mobile device is the driver of the vehicle. As an illustrative example, a default driving score can have a value of 100. In a first instance that the driver operates the mobile device while the vehicle is in the operational state, the driving score can be reduced to a value of 95. In a second instance where the driver operates the mobile device, the driving score can be further reduced to 85. A lower driving score can be indicative that the driver is more frequently distracted from the environment surrounding the vehicle.

If the operator of the mobile device is not the driver of the vehicle, the current driving score can be retained (block 410). This may be indicative that the driver is not distracted by not operating the mobile device, which can be a positive driving habit.

The system can determine whether there has been a period of the driver not operating the mobile device while driving (decision block 412). For instance, if the driver has not operated the mobile device during a trip in the vehicle over a given period of time (e.g., a week, a month), this may indicate a positive driving habit and the driving score can be raised.

In some embodiments, the set of requested identifying information (e.g., a fingerprint, an image of a face) can be compared with known authentication information in multiple profiles to derive a first profile of the multiple profiles with a first set of known authentication information that corresponds to the set of requested identifying information. For example, if an obtained fingerprint matches a stored fingerprint stored on a first profile associated with a passenger of the vehicle, the operator of the mobile device can be authenticated as the passenger of the vehicle. Each of the multiple profiles can be associated with a specific individual, where the identity of the operator of the client device includes a first individual associated with the first profile.

The authenticated entity of the operator of the client device can be determined as an individual other than the driver of the vehicle. Responsive to determining that the operator of the client device is the individual other than the driver of the vehicle, the driving score associated with the driver can be raised after a predetermined time period without determining that the authenticated entity of the operator of the client device is the driver of the vehicle.

If there is a period of time that the driver does not operate the mobile device while driving, the driving score can be raised (block 414). In some embodiments, a set of requested identifying information can be compared with known authentication information in multiple profiles to derive a first profile of the multiple profiles with a first set of known authentication information that corresponds to the set of requested identifying information. Each of the multiple profiles can be associated with a specific individual and the identity of the operator of the client device can include a first individual associated with the first profile. The system can determine that the authenticated entity of the operator of the client device is an individual other than the driver of the vehicle. Responsive to determining that the authenticated entity of the operator of the client device is the individual other than the driver of the vehicle, the driving score associated with the driver can be raised after a predetermined time period without determining that the authenticated entity of the operator of the client device is the driver of the vehicle.

If there is not a period of time that the driver does not abstain from operating the mobile device while driving, the driving score can remain the same (block 416). The system can determine whether a safe driving action has been detected (decision block 418). For example, if the vehicle is operating under a threshold speed (e.g., below 80 miles per hour, below a posted speed limit), the system can determine that a safe driving action has been performed. As another example, if the vehicle comes into close contact with another vehicle at a specific speed that is within a threshold distance, this may be deemed an unsafe driving habit that can lower the driving score, Modifying the driving score based on driving habits can encourage safe driving habits, thereby increasing safety of individuals while operating a vehicle.

In some embodiments, vehicle sensor data can be processed to derive a series of vehicle movement characteristics. The series of vehicle movement characteristics can include processing any of speed data, acceleration information, distance between the vehicle and other objects, vehicle turning speed information, vehicle braking deceleration, etc. The series of vehicle movement characteristics can be derived from vehicle sensor data, which can include any number of sensors disposed on the vehicle.

The derived series of vehicle movement characteristics can be compared with a set of driving rules to determine whether the derived series of vehicle movement characteristics are within the set of driving rules. The set of driving rules can include a series of rules that are indicative of safe driving habits. Example rules can relate to vehicle speed, acceleration, turning speed, deceleration, elapsed driving time, etc. Responsive to determining that the derived series of vehicle movement characteristics are within the set of driving rules, the driving score can be by a predetermined amount.

If the sate driving habit has been detected, the driving score can be raised (block 420). For instance, if the vehicle operates under a maximum speed rule, the system can determine that a safe driving action has been performed. This can allow for the driving score to be increased.

If the safe driving habit has not been detected, the driving score can remain the same (block 422). For example, if the vehicle movement characteristics are outside of the rules, the driving score can be lowered.

The system can detect that the vehicle is no longer in the operational state (block 424). For example, if the ignition of the vehicle is turned off or the transmission state is transitioned into a parked state, the vehicle may be output of the operational state, Responsive to such a determination, the mobile device can stop updating the driving score. Accordingly, after detecting that the vehicle is no longer in the operational state, the operator of the mobile device can freely operate the mobile device without impacting the driving score. Further, the mobile device can transition out of the vehicle mode, which can include no longer presenting the authentication interface when the vehicle is out of the operational state.

Example Device Implementation Overview

Figure 5:
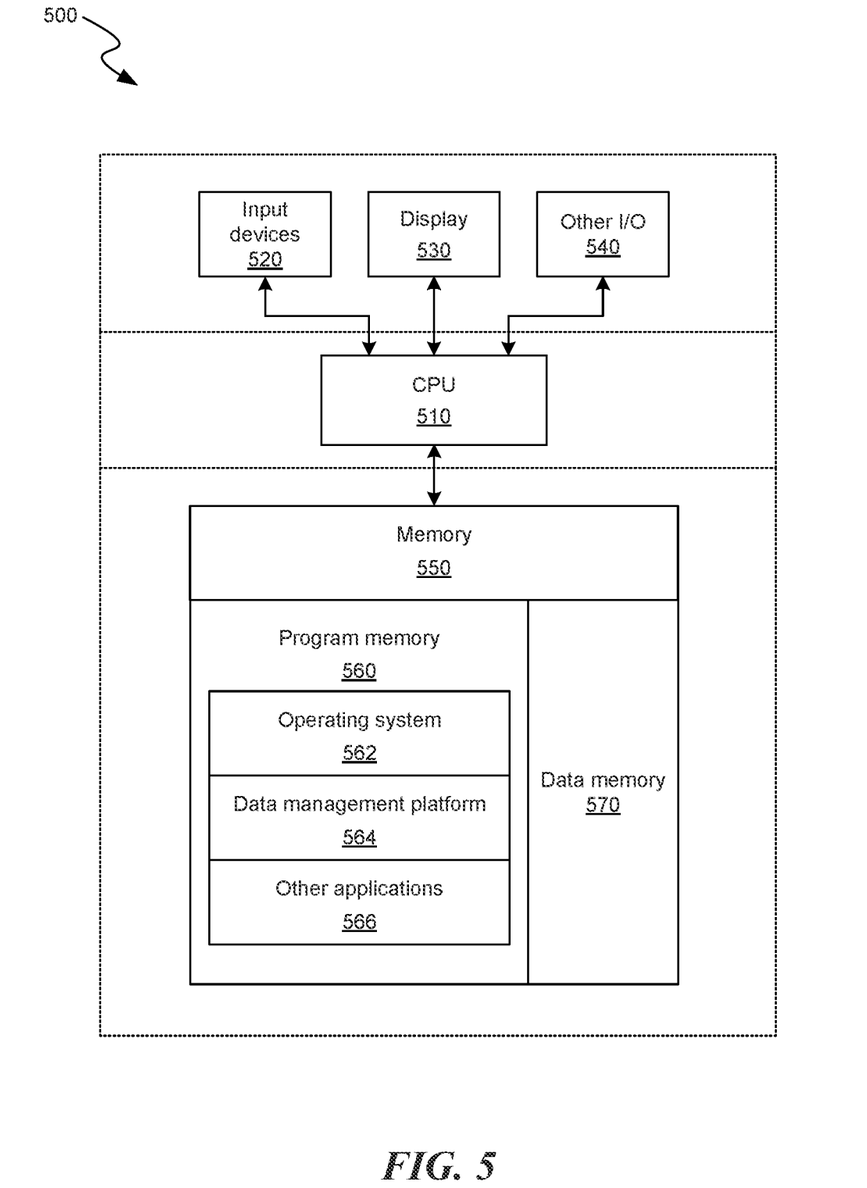
FIG. 5 is a block diagram illustrating an overview of devices on which some implementations of the present embodiments can operate.

FIG. 5 is a block diagram illustrating an overview of devices on which some implementations of the present embodiments can operate. The devices can comprise hardware components of a device 500, such as a server, mobile device, and/or computing node of a vehicle as described herein.

Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a person operating the device 500. In some implementations, display 530 includes the input device as part of the display, such as when the input device is a touchscreen or is equipped with an eye direction monitoring system. In some implementations, the display is separate from the input device. Examples of display devices are: an LCD display screen; an LEI) display screen; a projected, holographic, or augmented reality display (such as a heads-up display device or a head-mounted device); and so on. Other I/O devices 540 can also be coupled to the processor, such as a network card, video card, audio card, USB, FireWire or other external device, camera, printer, speakers, CD-ROM drive, DVD drive, disk drive, or Blu-Ray device.

In some implementations, the device 500 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 500 can utilize the communication device to distribute operations across multiple network devices.

The CPU 510 can have access to a memory 550. A memory can include one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software. Memory 550 can also include data memory 570 that can include various information as described in this patent document, which can be provided to the program memory 560 or any element of the device 500. The program memory 560 can include a data management platform 564 and other applications 566 capable of performing the processing tasks as described herein.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in the present Figures and/or in the various embodiments described in this patent document.

Those skilled in the art will appreciate that the components illustrated in FIGS. 1-5 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein,""above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media. that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C, A and B; A and C; B and C; A, B, and C, or multiple of any item, such as A and A; B, B, and. C; A, A, B, C, and. C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways, Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(t) will begin with the words "means for," but use of the term "for" in any other context is not intended to invoke treatment under 35 U.S.C. § 112(f) Accordingly, the applicant reserves the right to pursue additional claims after filing this application to pursue such additional claim forms, in either this application or in a continuing application.

What is claimed is:

1. A vehicle operation management system, comprising:
a server configured to:
receive, from a client device, a set of client device data and a set of vehicle sensor data;
process the set of client device data and the set of vehicle sensor data to determine whether a vehicle is in an operational state;
based on the determination that the vehicle is in the operational state, cause the client device to transition into a vehicle mode that limits access to a series of features of the client device until an operator of the client device is authenticated;
cause an output of an authentication interface on the client device, the authentication interface requesting identifying information of the operator of the client device;
obtain, from the client device, a set of requested identifying information into the authentication interface;
compare the set of requested identifying information, with known authentication information to authenticate an identity of the operator of the client device;
determine that the authenticated identity of the operator of the client device is an individual other than a driver of the vehicle; and
responsive to determining that the operator of the client device is the individual other than the driver of the vehicle, raise a driving score associated with the driver after a predetermined time period.

2. The vehicle operation management system of claim 1, the server further configured to:
parse the received set of vehicle sensor data to identify regions in the vehicle in which one or more vehicle sensors have been activated, the set of vehicle sensor data including any of vehicle seat weight sensor data, vehicle door sensor data, and/or vehicle imaging device sensor data; and
derive a number of individuals located in the vehicle based on each identified region in the vehicle in which any of the one or more vehicle sensors have been activated.

3. The vehicle operation management system of claim 1, the server further configured to:
responsive to determining that the client device is within the vehicle, obtain, from the client device, information relating to a number of network-accessible devices within a wireless communication range of the client device; and
process the information relating to the number of network-accessible devices to identify all individuals that correspond to the number of network-accessible devices, wherein the individuals that correspond to the number of network-accessible devices correspond to the number of individuals located within the vehicle.

4. The vehicle operation management system of claim 1, wherein the server is further configured to:
compare A) the set of requested identifying information with known authentication information in multiple profiles to derive a first profile of the multiple profiles with B) a first set of known authentication information that corresponds to the set of requested identifying information, each of the multiple profiles associated with a specific individual, wherein the identity of the operator of the client device includes a first individual associated with the first profile;
wherein the raising the driving score associated with the driver after the predetermined time period is performed without determining that the authenticated identity of the operator of the client device is the driver of the vehicle.

5. The vehicle operation management system of claim 1, the server further configured to:
process ignition state information or transmission state information included in the set of vehicle sensor data to determine whether an ignition state or a transmission state of the vehicle corresponds to the operational state, wherein the server is configured to cause the client device to transition into the vehicle mode responsive to determining that the vehicle is in the operational state.

6. The vehicle operation management system of claim 1, the server further configured to:
cause the client device to determine whether the client device is within a communication range of a communication interface of the vehicle, wherein the client device is configured to transition into the vehicle mode responsive to determining that the client device is within the communication range of the communication interface of the vehicle.

7. A method comprising:
acquiring, from a client device, a set of client device data and a set of vehicle sensor data from a communication interface of a vehicle;
processing the set of client device data and the set of vehicle sensor data to determine whether the vehicle is in an operational state;
based on the determination that the vehicle is in the operational state, derive a number of individuals located in the vehicle;
implementing a limiting vehicle mode on the client device that limits access to a series of features of applications executing on the client device until the operator of the client device is authenticated;
presenting, via the client device, an authentication interface that includes a request for a set of identifying information of an operator of the client device, wherein the presenting of the authentication interface on the client device is initiated via the limiting vehicle mode;
obtaining, via the client device, the set of identifying information;
comparing the set of identifying information with known authentication information to authenticate an identity of the operator of the client device;
determine that the authenticated identity of the operator of the client device is an individual other than a driver of the vehicle; and
responsive to determining that the operator of the client device is the individual other than the driver of the vehicle, raise a driving score associated with the driver.

8. The method of claim 7, wherein said comparing the set of identifying information with known authentication information to authenticate the identity of the operator of the client device further comprises:
deriving a type of information included in the set of identifying information, the type of information including any of a fingerprint, an image depicting a face, and a passcode indicative of the operator of the client device;
comparing the set of identifying information with the known authentication information of a corresponding type to the derived type of the set of identifying information to determine a first set of known authentication information that corresponds to the set of identifying information; and
identifying a first profile of multiple profiles that includes the first set of known authentication information, the first profile associated ,with an individual that corresponds to the operator of the client device.

9. The method of claim 7, further comprising:
wherein the authentication interface includes a lock screen or an audio prompt including the request for the set of identifying information; and
wherein the method further comprises, responsive to authenticating the identity of the operator of the client device, removing, at the client device, the authentication interface from the client device and allowing access to the series of features of applications executing on the client device.

10. The method of claim 7, further comprising:
processing the set of vehicle sensor data to derive a series of vehicle movement characteristics;
comparing the derived series of vehicle movement characteristics with a set of driving rules to determine whether the derived series of vehicle movement characteristics are within the set of driving rules; and
responsive to determining that the derived series of vehicle movement characteristics are within the set of driving rules, increasing the driving score by a predetermined amount.

11. The method of claim 7, further comprising:
parsing the received set of vehicle sensor data to identify regions in the vehicle in which one or more vehicle sensors have been activated, the set of vehicle sensor data including any of vehicle seat weight sensor data, vehicle door sensor data, and/or vehicle imaging device sensor data; and
deriving the number of individuals located in the vehicle based on each identified region in the vehicle in which any of the one or more vehicle sensors have been activated.

12. The method of claim 7, wherein:
the client device is configured to determine whether the client device is within a communication range of the communication interface of the vehicle, wherein the client device is further configured to transition into a vehicle mode responsive to determining that the client device is within the communication range of the communication interface of the vehicle.

13. A non-transitory machine-readable medium having machine executable instructions stored thereon that, when executed by one or more processors, direct the one or more processors to perform a method comprising:
receiving, from a client device, a set of client device data and a set of vehicle sensor data;
processing the set of client device data and the set of vehicle sensor data to determine whether a vehicle is in an operational state;
based on the determination that the vehicle is in the operational state, causing the client device to transition into a vehicle mode that limits access to a series of features of the client device until an operator of the client device is authenticated;
causing an output of an authentication interface on the client device, the authentication interface requesting identifying information of the operator of the client device;
obtaining, from the client device, a set of requested identifying information;
comparing the set of requested identifying information with known authentication information to authenticate an identity of the operator of the client device;
determining that the authenticated identity of the operator of the client device is an individual other than a driver of the vehicle; and
responsive to determining that the operator of the client device is the individual other than the driver of the vehicle, raising a driving score associated with the driver.

14. The non-transitory machine-readable medium of claim 13, wherein said comparing the set of requested identifying information with known authentication information to authenticate the identity of the operator of the client device further comprises:
deriving a type of information included in the set of requested identifying information, the type of information including any of a fingerprint, an image depicting a face, and a passcode indicative of the operator of the client device;
comparing the set of requested identifying information with the known authentication information of a corresponding type to the derived type of the set of requested identifying information to determine a first set of known authentication information that corresponds to the set of requested identifying information; and
identifying a first profile of multiple profiles that includes the first set of known authentication information, the first profile associated with an individual that corresponds to the operator of the client device.

15. The non-transitory machine-readable medium of claim 13, wherein the method further comprises:
parsing the received set of vehicle sensor data to identify regions in the vehicle in which one or more vehicle sensors have been activated, the set of vehicle sensor data including any of vehicle seat weight sensor data, vehicle door sensor data, and/or vehicle imaging device sensor data; and
deriving a number of individuals located in the vehicle based on each identified region in the vehicle in which any of the one or more vehicle sensors have been activated.

16. The non-transitory machine-readable medium of claim 13, wherein the method further comprises:
comparing A) the set of requested identifying information with known authentication information in multiple profiles to derive a first profile of the multiple profiles with B) a first set of known authentication information that corresponds to the set of requested identifying information, each of the multiple profiles associated with a specific individual, wherein the identity of the operator of the client device includes a first individual associated with the first profile;
wherein the raising the driving score associated with the driver is after a predetermined time period and is without determining that the authenticated identity of the operator of the client device is the driver of the vehicle.

17. The non-transitory machine-readable medium of claim 13, wherein:
the client device is configured to determine whether the client device is within a communication range of a communication interface of the vehicle, wherein the client device is further configured to transition into the vehicle mode responsive to determining that the client device is within the communication range of the communication interface of the vehicle.

* * * * *